United States Patent Office 3,493,385
Patented Feb. 3, 1970

3,493,385
PROCESS FOR THE REMOVAL OF UNDESIRABLE FLAVOR SUBSTANCES FROM PROTEIN HYDROLYZATES
Arthur W. Hack, Heilbronn, Germany, assignor to Corn Products Company, New York, N.Y., a corporation of Delaware
No Drawing. Filed June 17, 1966, Ser. No. 558,247
Claims priority, application Germany, July 19, 1965,
D 47,762
Int. Cl. A23j 1/00
U.S. Cl. 99—17                              7 Claims

ABSTRACT OF THE DISCLOSURE

It has been found that the major part of undesirable flavor substances in an acid hydroyzate obtained from vegetable or animal protein can be removed by subjecting the hydrolyzate to extraction with natural animal and/or vegetable fats and oils or synthetic esters of alcohols, especially low aliphatic, and preferably, polyhydroxy alcohols with 2 to 6 carbon atoms and straight chained fatty acids.

---

The invention refers to a process for the removal of undesirable flavoring matters from protein hydrolyzates.

It is known that substances of vegetable or animal origin containing protein can be decomposed through acid hydrolysis. As a rule, hydrochloric acid is used for the hydrolysis and the acid hydrolyzates obtained are subsequently neutralized with caustic soda or soda to a pH of between about 5 and 6, the residual acid being bound as sodium chloride. After neutralization, the humin substances originating from non-proteins are removed by filtration and the solution evaporated or transformed to a dry product, depending upon the purpose of use. Prior to or after removal of the humin substances, treatment with active carbon to remove color can also be applied.

These protein hydrolyzates obtained through acid hydrolysis contain undesirable flavor substances which distinguish them unfavorably from the taste of broth made of fresh meat or meat extract.

Hydrolysis is in general accomplished with 17–30% hydrochloric acid, but sulfuric acid may also be used at 105–109° C. under reflux or at temperatures of up to 135° C. under pressure. Neutralization is performed with sodium carbonate and sodium hydroxide, or with calcium carbonate or calcium hydroxide if sulfuric acid is used.

Surprisingly, it has now been found that the major part of these undesirable flavor substances in an acid hydrolyzate obtained from vegetable or animal proteins can be removed by subjecting the hydrolyzates to extraction with natural animal and/or vegetable fats and oils or synthetic esters of alcohols, especially low aliphatic and preferably polyvalent alcohols with 2 to 6 carbon atoms and straight-chained fatty acids.

The most expedient way to do this is to partly neutralize the acid hydrolyzates, which are freed, if necessary, of the humin substances through filtration prior to the extraction and to perform the extraction in a pH range of 2.0 to 4.5, preferably 2.8 to 3.0.

Treatment takes place at room temperatures or a slightly higher temperature which may exceed the melting point of the fat.

The weight ratio of aqueous phase and fat or oil during the extraction is preferably between 2:1 and 20:1. After the extraction, the hydrolyzates are neutralized to 5.5 to 6.0 pH and subsequently filtered.

Far-reaching removal of undesirable flavor substances can be attained through counter-flow extraction.

The fats used for the extraction can be subjected to refining, especially deacidification and deodorization in the customary manner for reuse.

The new process results in a far-reaching improvement in taste of hydrolyzates of vegetable or animal protein origin, which cannot be attained through treatment with decoloring carbon or other decolorizers. Protein hydrolyzates treated according to the invention are near in taste to broth made of fresh meat or meat extract. The undesirable flavor substances which are removed through the proposed process are, with the exception of alpha-ketobutyric acid and hydroxymethyl furfural, compounds of an unknown chemical nature. Apparently they are obtained in acid hydrolysis primarily from the non-proteins of raw materials containing proteins.

The following examples are to better illustrate the invention.

EXAMPLE I

Seven parts by weight of protein hydrolyzate obtained by hydrolyzing equal parts of wheat gluten and corn gluten with 20–25% hydrochloric acid at 120–130° C. for 6 hours are neutralized to a pH of 2.5 to 3.5 by the addition of sodium carbonate. To the solution freed from the precipitated humin substances through filtration, 1 part by weight of soybean oil is added and finely dispersed through vigorous agitation. After separating the oil through sedimentation or centrifuging of the hydrolyzate, the liquid freed from undesirable flavor substances is adjusted to the desired pH of 5.6 to 5.8 and filtered, if necessary.

EXAMPLE II

Five parts by weight of a hydrolyzate prepared according to Example I through partial neutralization and filtration are thoroughly mixed with 1 part by weight of solid animal fat at a temperature exceeding the melting point of the fat. The fat used for the removal of undesirable flavor substances can be separated acording to Example I through centrifuging or through removal of the solidified fat after cooling.

EXAMPLE III

Acid is added to 10 parts by weight of a finished soup seasoning made from protein hydrolyzate to adjust the pH to between 2.0 and 3.5 and the material is treated according to Examples I and II with 1 part by weight of hardened peanut oil.

The vegetable oils suitable for use in this invention include any edible oil without distinct flavor such as soy bean oil, peanut oil, cotton seed oil, sesame oil, etc. Chicken fat may also be used as liquid fat. Suitable solid fats are suet, lard, coconut fat and other hardened oils and train-oils which exhibit no off flavors. Acetic acid ethyl ester is excellent for use in this invention; other suitable esters include, for example, ethyl propionate, propyl acetate, propyl propionate and butyl acetate.

I claim:

1. A process for the removal of undesirable flavor substances from protein hydrolyzates of animal and vegetable proteins produced by acid hydrolysis comprising partially neutralizing the hydrolyzates to a pH falling within the range from about 2.0 to about 4.5, and subjecting the hydrolyzates to extraction with a substance selected from the class consisting of natural animal fats, vegetable fats and oils, and synthetic esters derived from low aliphatic alcohols containing 2 to 6 carbon atoms and straight chain fatty acids.

2. Process according to claim 1 characterized in that the acid hydrolyzates are freed from the humin substances by filtration.

3. Process according to claim 1 characterized in that the ratio of the aqueous phase to the fat during the extraction is 2:1 to 20:1.

4. Process according to claim 1 characterized in that after the extraction the hydrolyzates are neutralized to a pH of 5.5 to 6.0 and subsequently filtered.

5. Process according to claim 1 characterized in that the fats and oils used for the extraction are subjected to deacidification and deodorization refining for the purpose of reuse extractants.

6. Process according to claim 1 characterized in that the extraction is a countercurrent extraction.

7. Process according to claim 1 in which the ester is derived from a low aliphatic polyhydroxy alcohol containing 2 to 6 carbon atoms and a straight chain fatty acid.

References Cited

UNITED STATES PATENTS

| | | | |
|---|---|---|---|
| 1,922,484 | 8/1933 | Mapson et al. | 99—18 |
| 2,414,299 | 1/1947 | Hall | 99—14 |
| 2,539,544 | 1/1951 | Levin et al. | 99—208 |
| 2,593,487 | 4/1952 | Royal | 260—529 |
| 3,010,829 | 11/1961 | Turner | 99—107 |

A. LOUIS MONACELL, Primary Examiner

ROGER B. ANDEWELT, Assistant Examiner

U.S. Cl. X.R.

99—18; 260—112

PO-1050
(5/69)

UNITED STATES PATENT OFFICE
CERTIFICATE OF CORRECTION

Patent No. 3,493,385          Dated February 3, 1970

Inventor(s) Arthur Hack

It is certified that error appears in the above-identified patent and that said Letters Patent are hereby corrected as shown below:

Column 1, line 16 "hydrozate" should read "hydrolyzate";

Column 1, line 63 "temperatures" should read "temperature";

Column 2, line 13 "primarly" should read "primarily";

Column 3, line 7 "reuse extractants" should read "reuse as extractants

SIGNED AND
SEALED
JUL 7 1970

(SEAL)
Attest:

Edward M. Fletcher, Jr.
Attesting Officer

WILLIAM E. SCHUYLER, JR.
Commissioner of Patents